(12) United States Patent
Murai

(10) Patent No.: US 7,142,861 B2
(45) Date of Patent: Nov. 28, 2006

(54) MOBILE COMMUNICATIONS IN A HIERARCHICAL CELL STRUCTURE

(75) Inventor: Hideshi Murai, Zushi (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 284 days.

(21) Appl. No.: 10/733,775

(22) Filed: Dec. 12, 2003

(65) Prior Publication Data

US 2005/0130662 A1  Jun. 16, 2005

(51) Int. Cl.
*H04Q 7/20* (2006.01)

(52) U.S. Cl. ............... 455/444; 455/449; 455/443; 455/446; 455/448

(58) Field of Classification Search ............... 455/444, 455/449
See application file for complete search history.

(56) References Cited

U.S. PATENT DOCUMENTS

| 6,233,229 | B1 * | 5/2001 | Ranta et al. ............... 370/330 |
| 2002/0068581 | A1 * | 6/2002 | Salonaho ............... 455/456 |
| 2004/0082335 | A1 * | 4/2004 | Hirayama et al. ........... 455/450 |

OTHER PUBLICATIONS

Weidong et al (Vehicular Technology Conference; May 6-9, 2001; vol. 4; pp. 2412-2415).*
Takeo et al (Vehicular Technology Conference; IEEE 49th, vol. 3, May 16-20, 1999; pp. 1804-1808).*
Wang Weidong, et al.; "The Realization of Breathing Function in HCS CDMA System Level Simulation;" Wireless Technologies Innovation Laboratory, Beijing University of Posts and Telecommunications; Vehicular Technology Conference; May 6-9, 2001; vol. 4; pp. 2412-2415.
J. Kim, et al.; "An Adaptive Traffic Control Scheme for Hierarchically Structured CDMA Cellular Systems;" Department of Industrial Engineering, Taejon, Korea; School of Communication Engineering Information and Communications University, Taejon, Korea; Radio and Broadcasting Lab, ETRI; Vehicular Technology Conference; Sep. 24-28, 2000; vol. 5; pp. 2192-2196.
K. Takeo, et al.; "A Base Station Selection Technique for Up/downlink in CDMA Systems;" YRP Mobile Telecommunications Key Technology Research Laboratories; Wireless Systems Development Department, Oki Electric Industry; Department of Information Electronics, Nagoya University; Vehicular Technology Conference; IEEE 49th, vol. 3, May 16-20, 1999; pp. 1804-1808.
IEICE Trans. Commun., vol. E85-B, No. 10, Oct. 2002, On the Effect of Forward-Backward Filtering Channel Estimation in W-CDMA Multi-Stage Parallel Interference Cancellation Receiver, Ariyoshi et al., pp. 1898-1905.

(Continued)

*Primary Examiner*—Lester G. Kincaid
*Assistant Examiner*—Fred A. Casca
(74) *Attorney, Agent, or Firm*—Nixon & Vanderhye P.C.

(57) ABSTRACT

A hierarchical cell structure (HCS) cellular communications system includes a macro cell encompassing a smaller micro cell that employ the same frequency band. The macro cell includes a macro cell base station, and the micro cell includes a micro cell base station. An uplink communication cell boundary between the macro cell and the micro cell is established, and a downlink communication cell boundary between the macro cell and the micro cell is established. A radio network controller determines whether a condition exists in the HCS system which indicates that the uplink and downlink micro cell boundaries should be unbalanced. If the condition is met or exists, the power and/or antenna beam tilt of a downlink transmission from the micro cell base station is reduced to unbalance the uplink and downlink micro cell boundaries. Alternatively, the radio network controller may employ an offset value to mathematically reduce mobile detected pilot power levels associated with the micro base station.

29 Claims, 6 Drawing Sheets

OTHER PUBLICATIONS

IEEE Transactions on Vehicular Technology, vol. 43, No. 4, Nov. 1994, Microcell Engineering in CDMA Cellular Networks, J. Shapira, 817-825.

IEEE Journal on Selected Areas in Communications, vol. 12, No. 4, May 1994, Design Study for a CDMA-Based Third-Generation Mobile Radio System, A. Baier, pp. 733-743.

* cited by examiner

Balanced Link
(Cell boundary between both links is the same)

MOBILE COMMUNICATIONS IN A HIERARCHICAL CELL STRUCTURE

BACKGROUND AND SUMMARY OF THE INVENTION

Hierarchical cellular communications systems employ different size cells to provide both wide-coverage, basic-service (macro cell) and high-quality, high-capacity radio coverage in smaller areas (micro cell). Micro cells are useful in specific areas where increased capacity is needed. For example, micro cells may be located to serve areas of concentrated traffic within the macro cell or to provide a high data rate service. A micro cell uses a low-height antenna and a low base station transmit power which result in a small cell and a short frequency reuse distance, thereby increasing capacity. Additional benefits of a smaller cell include a longer talk-time (battery life time) for the user since mobile stations will likely use a substantially lower uplink transmit power to communicate with a micro cell base station than with a base station in a larger macro cell which is likely farther away.

In a hierarchical cell structure (HCS), macro cells and micro cells typically overlap to handle different traffic patterns or radio environments. The micro cell base station may be connected to the macro cell base station via digital transmission lines, or the micro cell base station may be treated just like a macro cell and be connected directly to a base station controller node like a base station controller (BSC) in the well-known global system for mobile communications (GSM) systems or a radio network controller (RNC) in the third generation, wideband, code division multiple access (WCDMA) systems.

Smooth handover between macro and micro cells is important to provide continuous communication capability for mobile communications. But handover between macro cells and micro cells is more difficult to perform than traditional handover between macro cells, particularly in the case of large obstructions such as buildings often encountered in micro cell environments in the case of high velocity mobiles, and because of overlapping coverage areas. One way to perform HCS handover is to have the macro and micro cells employ different frequencies. The same cell class/size uses the same carrier frequency, and different cell classes/sizes use different carrier frequencies. Although CDMA enables efficient use of the same frequency channels in adjacent cells of the same hierarchical layer, (i.e., all micro cells), different frequency channels are assigned to cells on different hierarchical layers in order to avoid power control problems and excessive interference. But because of these different frequencies, "soft" handover and macro diversity are not feasible between macro and micro cells. Instead, an inter-frequency "hard" handover is required. Furthermore, seamless inter-frequency handovers are troublesome in CDMA systems. In addition to these disadvantages, using different frequencies limits efficient use of the available frequency spectrum simply because that spectrum must be divided between the different class/size cells. Twice as much bandwidth is needed if different frequencies are used. Moreover, if a guard zone must be maintained around the micro cell to protect it from a larger, more powerful, overlying macro cell, capacity is further reduced.

Alternatively, the macro and micro cells may employ the same frequency which allows soft handover and macro diversity to be used and provides more capacity. There are several well known advantages to soft handover in mobile communications including make-before-break handover to sustain continuous service at cell boundaries and compensation for fading and other disturbances to the received signal. And all systems hope to increase capacity.

For a same-frequency HCS system, however, a "balanced link" is conventionally believed necessary. A balanced link means that the cell boundary for uplink communications from a mobile station to a base station is the same as that for downlink communications from the base station to that mobile station. This means that for a mobile located at the cell boundary between macro and micro base stations, the same transmit power is required for the mobile station uplink signal to be received at the macro and micro base stations. In the downlink, the mobile receives a pilot signal from the macro and micro base stations at the same power level.

In order to balance the uplink and downlink, the two (or more) base stations adjust a pilot signal power allocation ratio—a ratio of pilot power to total transmission power per carrier frequency. Calculation of the pilot signal power allocation ratio is described in "Microcell Engineering in CDMA Cellular Networks," by Shapira, *IEEE Transactions on Vehicular Technology*, Vol. 43, No. 4, November 1994, which is incorporated herein by reference. If the up and down links are unbalanced, then one link limits capacity while the other link has some capacity margin.

Transmit power control (TPC) is also required when the same frequency is used in mutual cells and in both the uplink and downlink directions, respectively. The purpose of transmit power control is to keep (1) the actual signal quality of mobile signals received at a base station close to a target signal quality and (2) the actual signal quality of base station signals received at a mobile station close to a target signal quality. But TPC is only effective for managing the power level of active communications between mobiles and the cell base station. TPC does not control the transmit power of a mobile communicating with another-cell in the uplink, and TPC does not control the power of a base station that is not communicating with the mobile sending the TPC command. For downlink communications in an HCS, fast fading and/or shadowing in the radio path may result in excessive interference to a mobile station within the micro cell. This is because the macro base station usually has a taller antenna and a greater total transmission power which may exceed the dynamic power control range of the micro base station. Transmit power control in the micro cell usually does not prevent this excessive interference from the macro base station to a mobile communicating with a micro base station. The excessive interference caused by the macro cell in the downlink results in lower capacity or even dropped calls in the micro cell.

Another problem in HCS systems is the premature and often unnecessary handover of a connection where the mobile station is moving at a high velocity. A fast moving mobile will not likely remain in the micro cell for enough time to warrant handover. It would be helpful to prevent unnecessary micro cell handovers for fast moving mobiles in HCS systems to avoid the overhead, signaling, and the resulting reduction in bandwidth associated with that signaling for unnecessary handovers.

The present invention solves these and other problems in the context of a HCS by using an unbalanced link. Macro and micro cells in the HCS use the same frequency/frequency band to increase capacity and attain diversity benefits as compared to using different frequencies/frequency bands. Complicated and time-consuming inter-frequency handover, which may sometimes be unstable, is also avoided. The micro cell downlink coverage is reduced so that the radio uplink and downlink for the HCS are purposefully unbalanced. A smaller micro cell in the downlink may be beneficial in terms of providing stable service to a highly-loaded but relatively-small service area.

The downlink micro cell coverage reduction may be accomplished in one example embodiment by actually reducing the micro cell pilot transmit power level. In another example embodiment, downlink micro cell coverage reduction may be accomplished by tilting an antenna beam of the micro cell base station that transmits/receives downlink/uplink signals from/to the micro cell. In a third example embodiment, downlink micro cell coverage reduction may be accomplished by mathematically reducing a detected power level of the micro cell pilot signal and using that reduced pilot power in handover decisions.

Handovers to the micro cell in an unbalanced link, being based on detected or otherwise determined micro cell pilot powers, occur less/later than if a balanced link was used. Indeed, some potential handovers will not even occur. Although the micro cell downlink coverage is reduced with an unbalanced link, mobiles that would be served by the micro cell with a balanced link are adequately served by the macro cell. And an unbalanced link offers more stable HCS service in the micro cell and provides greater overall capacity gain for the HCS system. Moreover, the unbalanced link offers the micro cell base station a downlink transmission power "margin." Reduced coverage of the micro cell base station means that the total transmission power from the micro cell base station is reduced. The base station transmission power to a relatively close mobile station is relatively small compared with that to a mobile station relatively far from the base station. As a result, the micro cell base station has some additional margin/flexibility to increase its maximum transmit power if needed to reach a mobile station suffering excessive interference with acceptable signal power and quality.

A hierarchical cell structure (HCS) cellular communications system includes a macro cell encompassing a smaller micro cell that employ the same frequency band. The macro cell includes a macro cell base station, and the micro cell includes a micro cell base station. An uplink communication cell boundary between the macro cell and the micro cell is established, and a downlink communication cell boundary between the macro cell and the micro cell is established. A radio network controller determines whether a condition exists in the HCS system which indicates that the uplink and downlink micro cell boundaries should be unbalanced. If the condition is met or exists, the effective range of a downlink transmission from the micro cell base station is reduced —directly or indirectly—to unbalance the uplink and downlink HCS cell boundaries.

Three, non-limiting, example techniques for implementing an unbalanced link are described. First, the radio network may directly instruct the micro cell base station to reduce the power level of its pilot signal. Second, the radio network may instruct the micro cell base station to "tilt" the antenna corresponding to the micro cell pilot to decrease its azimuth angle thereby effectively decreasing the range of the pilot signal. Third, the radio network controller may send an offset value to one or more mobile stations near the micro cell. Those mobiles use that offset to mathematically reduce the detected pilot power from the micro base station. Because the received micro cell pilot power is decreased by that offset, the mobile perceives the micro cell base station as farther away, and is thus more likely to be serviced by the macro base station. Alternatively, the radio network may selectively apply the offset to mobile reported pilot powers to achieve a similar effect. These latter two "indirect" approaches may be desirable because they do not actually reduce the pilot power level. A strong pilot signal is necessary for accurate channel estimation and signal demodulation. But these two approaches still effect a reduced downlink micro cell size.

Another inventive feature relates to uplink interference resulting when mobiles near the micro cell transmit in an unbalanced link situation. Inter-cell interference will mainly be caused by a mobile transmitting near the micro cell which was forced to communicate with the macro base station because of the unbalancing. If the interference associated with an uplink transmission from the mobile station to the macro cell base station is likely to exceed a predetermined limit, then interference cancellation (IC) is preferably performed at a receiver in the micro cell base station.

Yet another inventive feature relates to high velocity mobile stations. If the speed of the mobile station exceeds a threshold, the radio network controller may prevent handover of the mobile connection to the micro cell by reducing (or reducing by a larger amount) the downlink range of the micro cell. A smaller micro cell downlink reduces the chance that a fast moving mobile will be handed over to the micro cell and then quickly handed right back to the macro cell. Overhead, signaling, and associated bandwidth reduction for the macro-to-micro-to-macro cell handovers are avoided.

DETAILED DESCRIPTION

For purposes of explanation and not limitation, the following description sets forth specific details, such as particular electronic circuitry, procedures, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. The processing functions in particular may be implemented using a programmed microprocessor or general-purpose computer, using an application specific integrated circuit (ASIC), and/or using one or more digital signal processors (DSPs).

Figure 1:
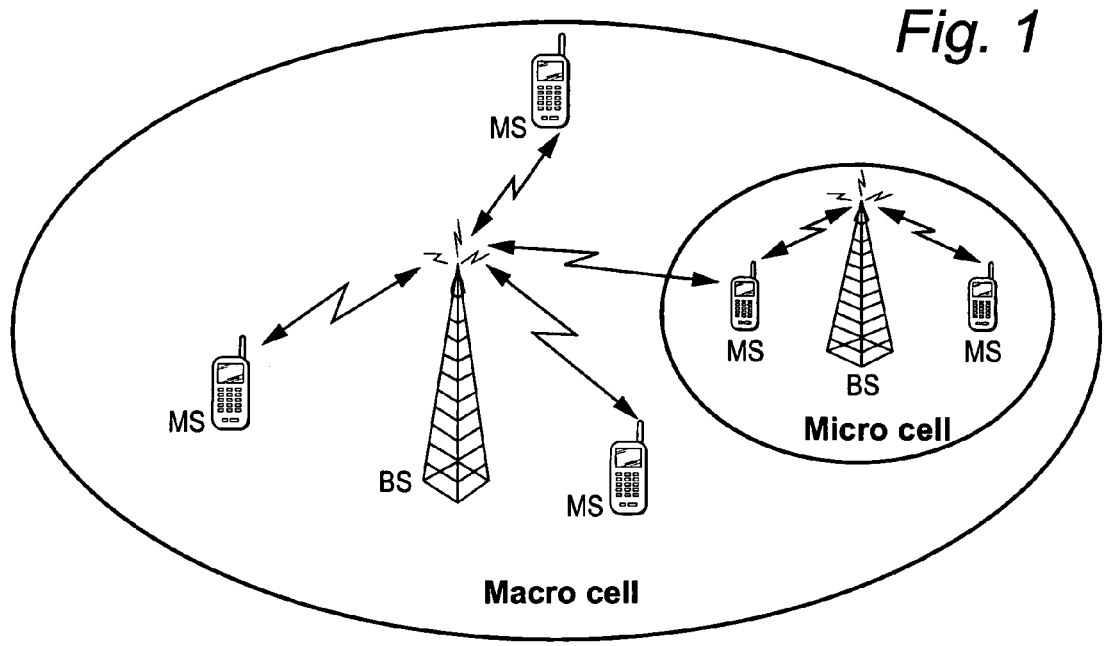
FIG. 1 shows a hierarchical cell structure (HCS) for use in a cellular communications system where a macro cell encompasses a smaller micro cell.

FIG. 1 shows a hierarchical cell structure (HCS) for use in a cellular communications system. A large macro cell encompasses a smaller micro cell. The macro cell includes a macro cell base station (BS) communicating with mobile stations (MSs) in the macro cell and one or more mobile stations in or near the micro cell. The micro cell includes a micro cell base station communicating with mobile stations in the micro cell and perhaps one or more mobile stations in the macro cell. Both macro and micro base stations operate using the same frequency(ies) as is done in CDMA and WCDMA systems. This increases system capacity as compared to the situation where the macro and micro cell base stations use different frequencies. Inter-frequency "hard" handover is also avoided.

Because the macro and micro cells employ the same frequency band in the HCS, soft handover and cell site diversity may be used. For a same frequency HCS system, however, a "balanced link" is conventionally believed necessary. In a balanced link, the macro/micro cell boundary for uplink communications from a mobile station to a base station is the same as the macro/micro cell boundary for downlink communications from the base station to that mobile station. This means two things: (1) for a mobile located at the cell boundary between the macro and micro base stations, the same transmit power is required for the mobile station's uplink signal to be received at the macro and micro base stations, and (2) in the downlink, the mobile receives respective pilot signals from the macro and micro base stations at the same power level.

Figure 2:
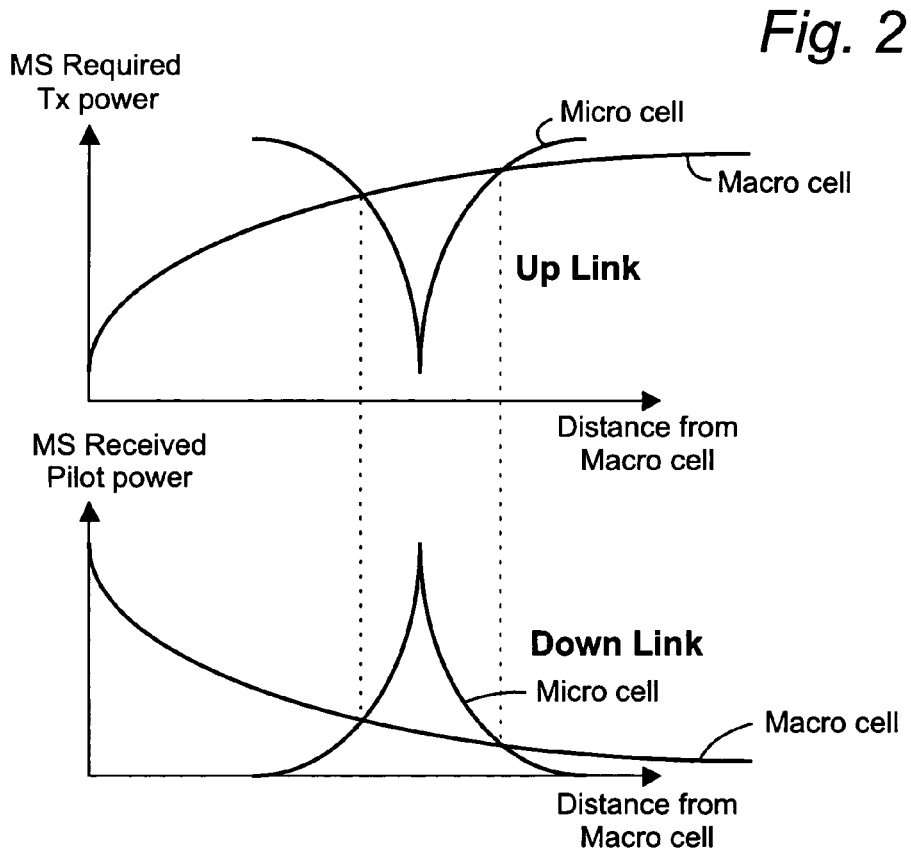
FIG. 2 graphs mobile required transmit power and mobile received pilot power based on a distance from the macro cell base station in a HCS.

This balanced link concept is illustrated in FIG. 2 which graphs (1) mobile-required transmit power versus distance from the macro cell base station in a HCS in the top graph, and (2) mobile-received pilot power versus distance from the macro cell base station in a HCS in the bottom graph. The top graph can be viewed as the uplink cell boundary between the macro and micro cells. The bottom graph can be viewed as the downlink cell boundary between the macro and micro cells. The vertical dashed lines where the micro and macro cell lines intersect show that the uplink and downlink macro/micro cell boundaries are at the same distance from the macro cell base station resulting in a balanced link.

Figure 3:
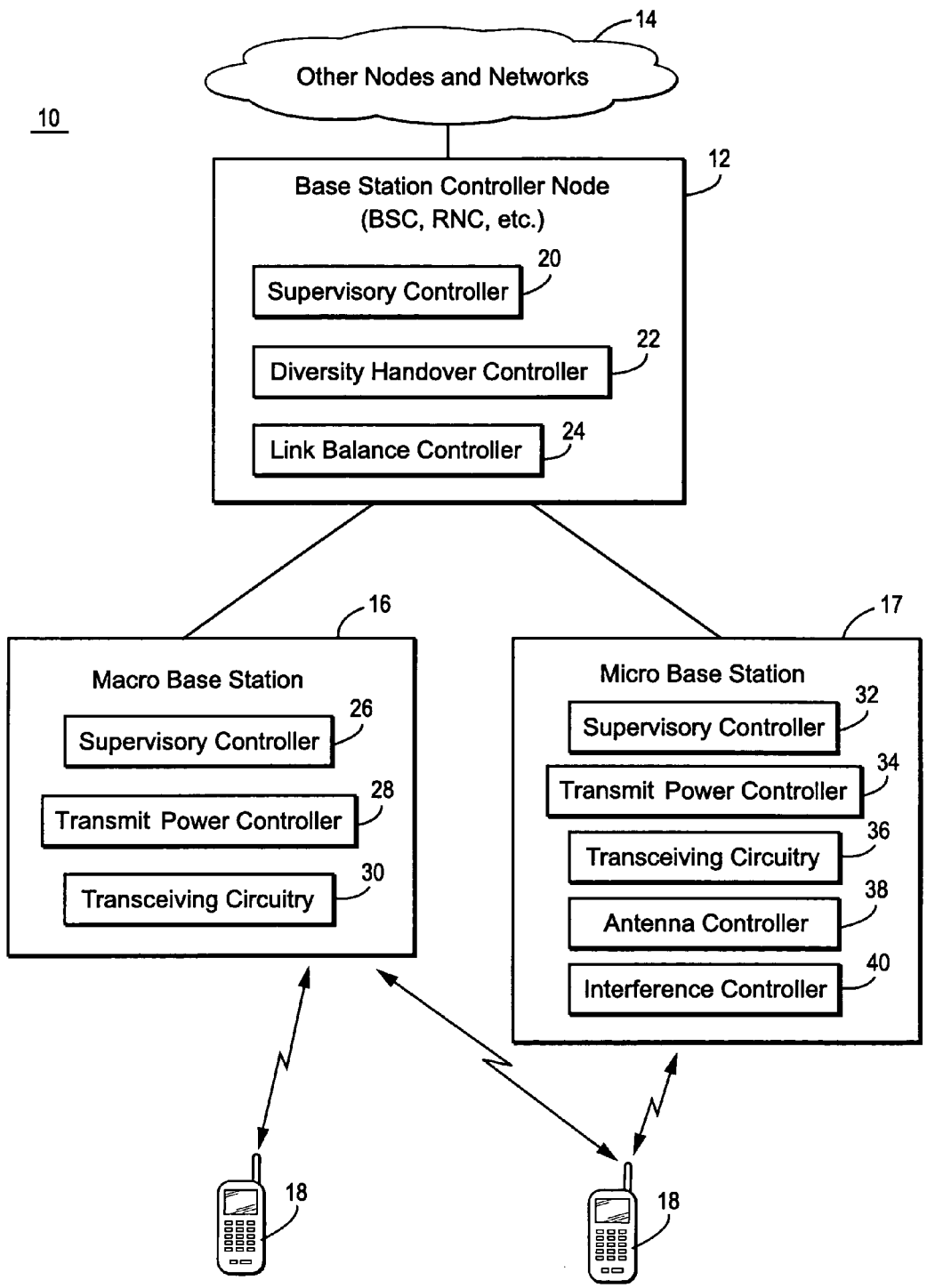
FIG. 3 is a function block diagram of various nodes in hierarchical cell structure (HCS) shown in FIG. 1 in a cellular communications system.

FIG. 3 shows a cellular communications system 10 that incorporates an HCS with a micro cell embedded in a larger macro cell. A base station or other radio network controller 12 is coupled to one or more other networks and nodes represented by a cloud 14. The base station or radio network controller 12 is also coupled to a macro cell base station 16 and a micro cell base station 17, and may also be coupled to one or more other macro or micro base stations. The macro and micro cell base stations communicate with mobile stations 18 over a radio air interface using known radio access techniques and protocols such as those employed in third generation, WCDMA cellular systems.

The base station control node 12 in a WCDMA system is a radio network controller (RNC) and includes among other things a supervisory controller 20 for controlling general or overall operations at the RNC 12, a diversity handover controller 22 for controlling soft handover of mobile connections between cells and/or sectors, and a link balance controller 24 for controlling whether and how much to unbalance the uplink and downlink cell boundaries between the macro and micro cell base stations. The macro cell base station 16 includes among other things a supervisory controller 26, a transmit power controller 28, and radio transceiving circuitry 30. The micro cell base station 17 includes among other things a supervisory controller 32, a transmit power controller 34, and radio transceiving circuitry 36. The cell micro base station 17 also preferably includes antenna-tilting circuitry 38 and interference cancellation circuitry 40. Although not shown, each mobile station 18 includes radio transceiving and control circuitry sufficient to conduct radio communications with the radio network, to adjust its uplink transmit power, and to detect and report the signal quality of downlink base station transmissions to the radio network controller.

Figure 4:
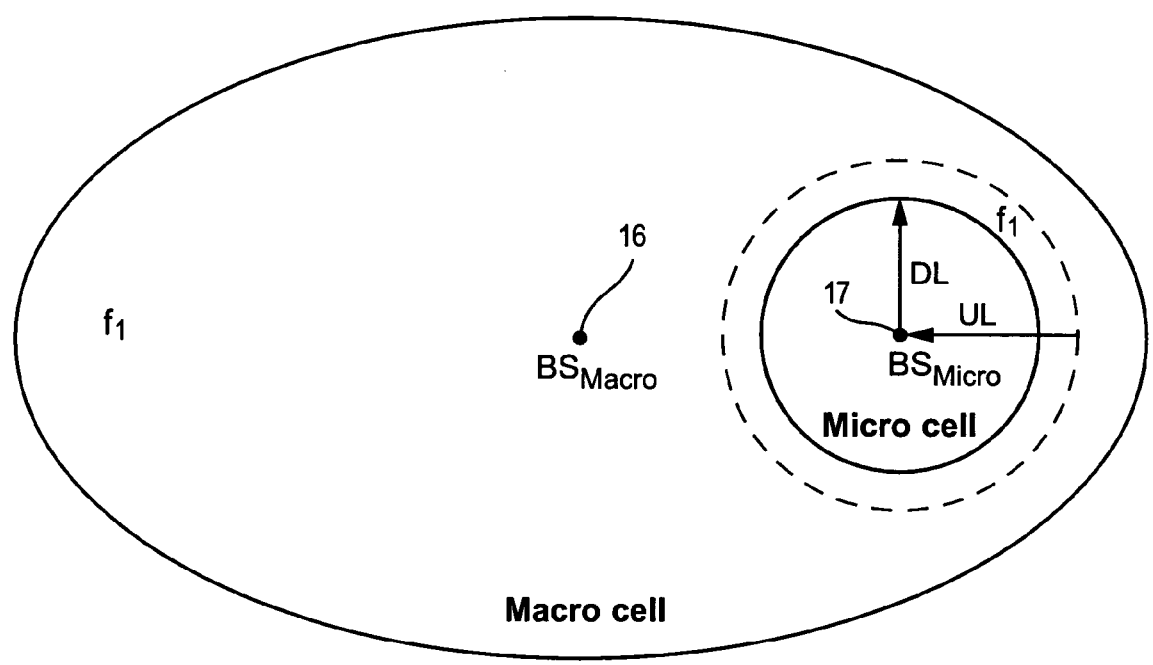
FIG. 4 is a diagram illustrating an unbalanced link in the hierarchical cell structure (HCS) shown in FIG. 1.

For the situations and reasons described in the background, it is desirable under one or more conditions or scenarios for the link balance controller 24 to implement an unbalanced link between the macro and micro cell base stations 16 and 17. FIG. 4 shows a HCS similar to that in FIG. 1 but with an unbalanced link. Specifically, the downlink (DL) transmission cell boundary from the micro cell base station 17 is smaller that the uplink (UL) transmission cell boundary to the micro cell base station 17.

Figure 5:
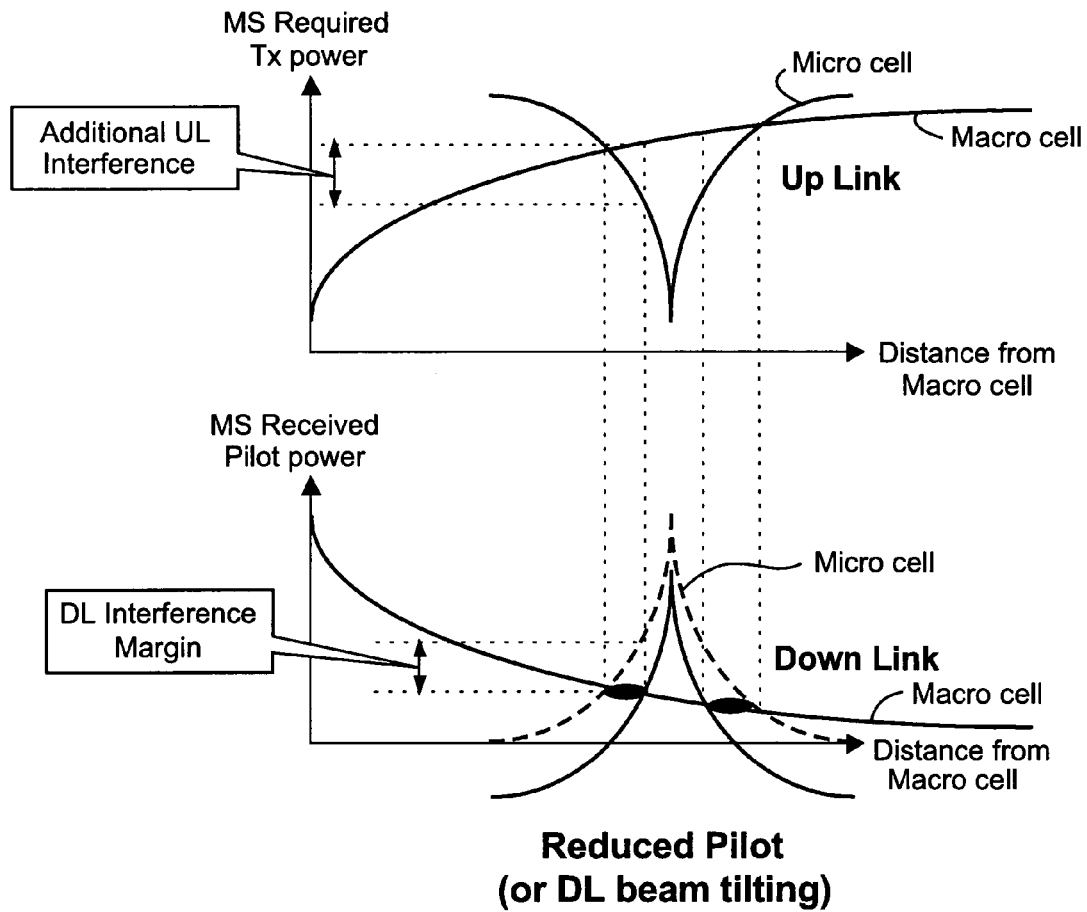
FIG. 5 graphs mobile required transmit power and mobile received pilot power based on a distance from the macro cell base station in the HCS shown in FIG. 4.

FIG. 5 graphs mobile-required transmit power versus distance from the macro cell in the top graph and mobile-received pilot power based on distance from the macro cell in the bottom graph. As with FIG. 3, the top graph can be viewed as the uplink cell boundary between the macro and micro cells, and the bottom graph can be viewed as the downlink cell boundary between the macro and micro cells. But unlike FIG. 3, the vertical dashed lines where the micro and macro cell lines intersect show that uplink and downlink boundaries are not the same distance from the macro cell base station thereby evidencing an unbalanced link. Specifically, the intersections in the top graphs remain the same as in FIG. 3, but the first intersection in the bottom graph occurs at a farther distance from the macro cell base station, and the two lower intersections are closer together. In short, the micro cell downlink coverage is smaller than the micro cell uplink coverage.

The reduced micro cell downlink may be implemented in any appropriate way. Three, non-limiting, example techniques are described. Other techniques may be employed. One straight-forward way is for the link balance controller 24 to instruct the micro base station power controller 34 to directly reduce the micro cell base station pilot signal transmission power by an amount determined by the link balance controller 24.

But the reduced micro cell base station pilot power may impair a mobile station's ability to make accurate channel estimates in the micro cell from the balanced link within the unbalanced coverage. Accurate channel estimation is necessary for demodulation/reception. In fact, pilot power is used in a number of receiver operations. So it may be helpful to avoid reducing the actual pilot power level and use some other "indirect" way to reduce the micro cell downlink boundary.

Another example of directly creating an unbalanced link is for the link balance controller 24 to instruct antenna-tilting circuitry 38 of the micro base station to "tilt" down the antenna/antenna array transmitting the pilot signal, (e.g., a lower azimuth). This down-tilt decreases the coverage of the micro cell, thus reducing the downlink micro cell size. The amount of antenna tilt depends on how much the downlink micro cell size is to shrink, and that amount is determined by the link balance controller 24. Although the antenna tilt method does not impair channel estimation because the pilot power level is not reduced, interference cancellation (which may be useful in the micro cell for reasons explained below) is somewhat limited in this beam-tilt approach. Because there is no information about mobile stations located in the area between the uplink and downlink boundary in FIG. 5, interference cancellation can not be applied to those mobiles.

A third approach indirectly reduces the size of the micro cell downlink without actually reducing the micro cell's coverage by pilot power or antenna tilt in order to create an unbalanced link. Here, indirect simply means that the measured received pilot power is modified before it is used. The link balance controller 24 sends power offset information on a broadcasting channel or some control channel to one or more mobiles near or in the micro cell via the macro and/or micro base station(s). Each such mobile station subtracts that offset from the power level it detects of the pilot signal transmitted by the micro cell base station. Based on this offset-lowered, micro cell pilot power value, the mobile initiates handover as usual. In addition, the actually measured value (non-offset lowered) is reported to the radio network controller.

The lower power value influences the radio network controller's handover decisions effectively reducing the number of mobiles that will be handed over to the micro cell. The lowered pilot power value indicates that the micro cell is too far away to establish a good connection for that mobile.

The need for and the extent of an unbalanced link are determined by the link balance controller 24 and may be based on one or more factors/conditions. Non-limiting, example factors/conditions include one or more of the following: the cellular system load, traffic conditions, a radio link propagation condition between the macro cell base station and the mobile station, a height of an antenna in the macro cell base station, cell size(s), a geographical relationship between the macro cell base station and the micro cell base station, and mobile station speed. The amount of excessive downlink interference from macro to micro cell depends on these factors.

One non-limiting example for determining whether to balance or unbalance the link is based on a quality of mobile user service in the downlink. The link balance controller 24 measures the likelihood that one or more mobile users will receive a satisfactory or a requested quality of service with a balanced link. If the likelihood is lower than a predetermined value, the link balance controller 24 implements an unbalanced link. An example is service "outage," i.e., the percentage of mobile users that will not be satisfied with a required service quality. Any one or more of the above factors/conditions (and/or other factors/conditions) may also be considered in the link balancing/unbalancing decision.

One of the factors mentioned is mobile speed or velocity, which corresponds to the Doppler frequency of fading. A fast moving mobile will travel through the micro cell in a short time. That short time will likely mean that a handover is not worth the effort since the mobile will quickly move out of range of the micro base station. But if there is a handover for a fast moving mobile, then communication with the micro cell base station will be for a short time period. The radio network can reduce the probability that the fast moving mobile will be handed over to the micro cell by increasing the amount by which the micro cell size is decreased, either absolutely or compared to the amount for a slower moving mobile. A smaller micro cell downlink reduces the chance that a fast moving mobile will be handed over to the micro cell and then quickly handed right back to the macro cell. Overhead, signaling, and associated bandwidth reduction for the macro-to-micro-to-macro cell handovers are avoided. The mobile will initiate handover based on a received pilot power from each base station in the downlink. If the mobile increases the offset value according to its velocity, then a faster mobile will have higher offset value, which results in a reduction of pilot power from the micro cell base station. This reduces the pilot power from the micro cell base station corresponding to a smaller micro cell coverage. One way to detect the mobile velocity is to measure the Doppler frequency of the fading, or the moved distance divided by the measured time when the proper location service is available.

The link unbalance causes several effects. First, some mobiles near the micro cell/macro cell boundary now no longer served by the micro base station pilot will communicate with the macro cell base station rather than the micro base station. Second, and as a result, there will be fewer handovers to the micro cell, and those handovers that do occur, will occur later. Handover decisions to/from the macro and micro cells are based on comparisons of received pilot signal strength/quality as compared to a handover threshold. The mobile connection will likely be handed back over to the macro cell sooner because the micro cell is smaller, e.g., when the mobile is traveling through the micro cell. Third, the reduced downlink signal power from the micro base station means "new" area is added to the macro cell.

A fourth effect is that mobiles in or near the new macro cell area that communicate with the macro base station experience less downlink interference from the micro cell base station transmissions. This lessened interference ensures that downlink interference does not significantly impact those mobiles the micro cell has the potential to communicate with in a balanced link. Interference from the micro base station can be managed by downlink power control by the macro cell to adjust the transmission power to those mobiles.

Fifth, the micro cell base station acquires a downlink transmission power margin to reach mobiles within the reduced size micro cell. In other words, the micro cell base station can allocate a higher transmission power to mobiles in the micro cell on a selective basis if necessary or desirable. For example, there may be periods of excessive interference to mobiles in the micro cell caused by the macro cell base station transmissions. The transmission power margin allows the micro cell base station to counteract that excessive interference with an increased transmit power level corresponding to some or all of the margin.

A sixth effect is that the micro cell base station transmit power control (TPC) has a wider dynamic power range corresponding to the increased transmit power margin resulting from the unbalanced link/reduced downlink micro cell size. Seventh, some added interference is experienced in the uplink in the macro cell because the mobiles transmitting to the macro cell base station in this new area will be transmitting at a relatively high power level to reach the macro cell base station.

In an unbalanced link condition, there is additional uplink interference in the micro cell mobile stations which are transmitting in the "gray" area newly-added to the macro cell as shown in FIG. 3. In other words, these mobile stations transmitting in this new, "gray" area are transmitting back to the macro base station at a fairly high power level, which increases the uplink interference in the micro cell. In certain situations, this additional uplink interference may be acceptable and need not necessarily be compensated. One such example is Internet type traffic in which the uplink traffic volume is relatively light and most of the traffic is downlink coming from the Internet, e.g., downloading web pages, etc.

On the other hand, there may situations in which it is necessary to compensate for this additional uplink interference in the micro cell. Accordingly, the radio transceiving circuitry 36 in the micro base station preferably includes interference cancellation (IC) to reduce or otherwise compensate for the additional uplink interference. One article describing interference cancellation (IC) is entitled, "On the Effect of Forward-Backward Filtering Channel Estimation in W-CDMA Multi-Stage Parallel Interference Cancellation Receiver," by Ariyoshi et al., from IEICE Trans. Commun., Vol. E85-B, No. 10, October 2002, pages 1898–1905, the disclosure of which is incorporated herein by reference. In general, a multi-stage parallel interference cancellation receiver in the micro base station performs interference cancellation such that an interference replica for each mobile user signal generated from a tentatively demodulated signal is subtracted from a total received signal to suppress multiple access interference. In the interference canceler receiver, the interference cancellation processing for all active mobile users is simultaneously performed in parallel and iterated over several stages. Other IC techniques may be employed.

One interference cancellation approach is to reduce the uplink interference from mobiles transmitting within micro cell as well as from mobiles who are transmitting from outside the micro cell that likely are increasing the uplink interference in the micro cell. These external mobile stations are mainly those connected to the macro cell because of the unbalanced link that would normally be connected to the micro cell in a balanced link. Alternatively, interference cancellation may be performed more simply by only reducing intra-cell interference from uplink transmissions from mobile stations transmitting from within the micro cell. While this alternative IC approach tends to limit the amount of interference cancellation, it is simpler to implement because there is no need to acquire and consider information about mobiles transmitting outside the micro cell. Because if the inter-cell approach is used, the macro cell base station must provide to the micro cell base station information about the interfering mobiles in the area between the uplink cell boundary and the downlink cell boundary, (indicated with black ellipses in FIG. 5), including actual power levels, scrambling codes, timing, etc. The micro cell base station interference canceler uses this information to generate a replica/estimation of the interference to be cancelled.

Figure 6:
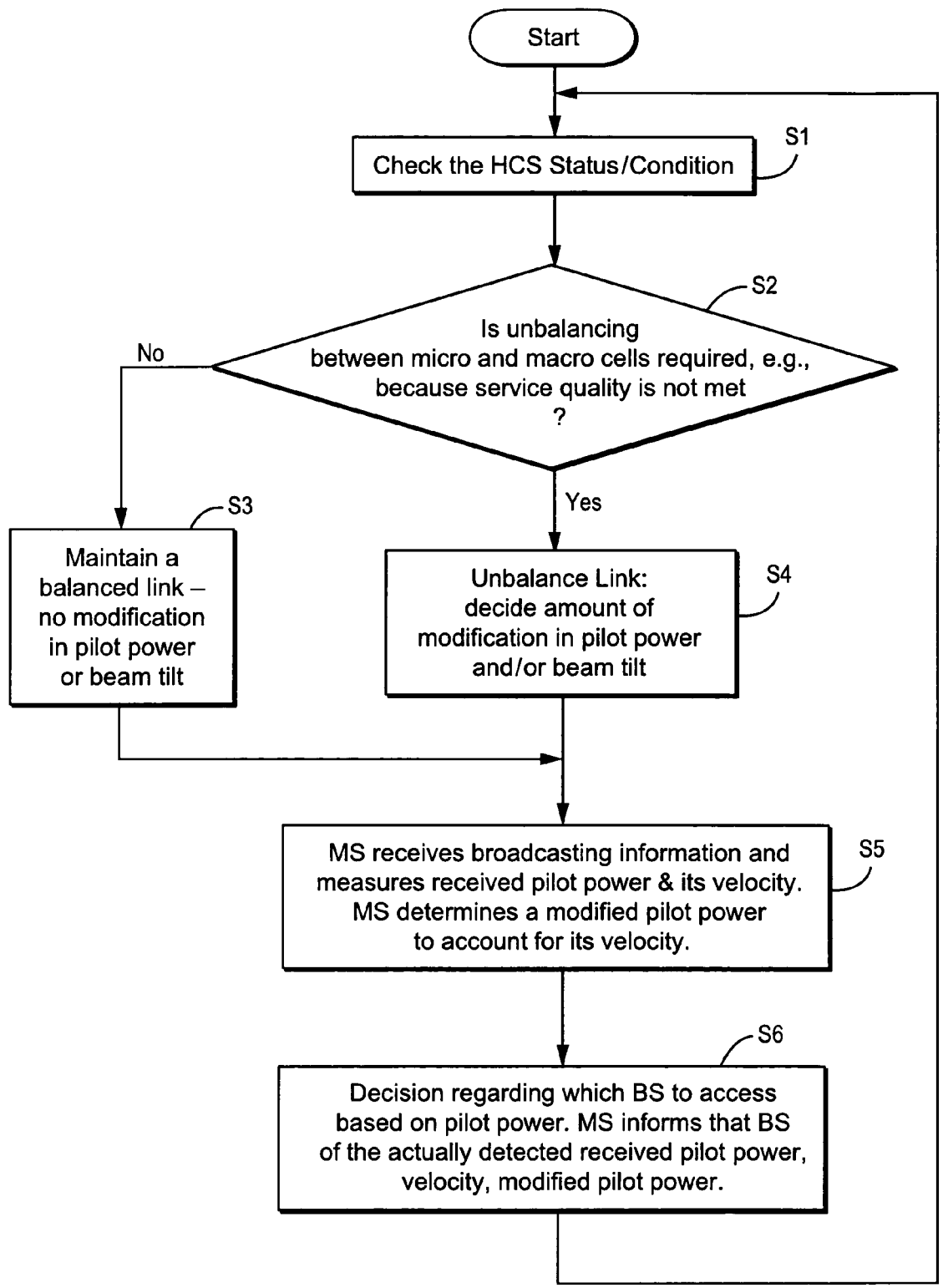
FIG. 6 is a flow chart diagram illustrating procedures in accordance with a non-limiting example for implementing and managing an unbalanced link a HCS like that shown in FIG. 4 in a cellular communications system.

Reference is now made to the flow chart in FIG. 6 which illustrates non-limiting, example procedures related to certain aspects of the present invention. In step S1, the radio network controller 12 checks on the status/condition of the HCS system to determine what type of link is needed or is appropriate. In the decision step S2, based on the status/condition, the decision is made whether an unbalanced or balanced link between the micro and macro cell boundaries is required. As explained above, this link unbalancing decision is made by the radio network controller based on any appropriate factor(s). One such example factor which suggests that unbalancing the link may be necessary because there is a likelihood of service "outage," i.e., a certain percentage of mobiles in the HCS will likely not receive a minimum desired service quality. If the service quality or other criterion/criteria is/are met, a balanced link is maintained (step S3). No modification in pilot power or beam tilt is made.

In the case of an unbalanced link, the radio network controller decides an amount by which to unbalance the link and sends (in this example) a command to the micro base station to effect that unbalance (step S4). As described above, two non-limiting example ways of effecting the unbalance (among others) are to reduce the pilot power of the micro cell base station and/or tilt the azimuth of the micro base station antenna array corresponding to the downlink pilot signal for the micro cell in a downward direction to effectively reduce its coverage.

Each mobile station in the micro cell or in the macro cell close to the micro cell receives broadcasting information from the macro cell base station or the micro cell base station and measures the received pilot power of those respective signals (step S5). The mobile station also preferably (but not necessarily) measures its own current velocity, which may be used to determine a modified pilot power with an offset value provided by a broadcasting channel. For a higher mobile velocity, the offset value increases the modified pilot power so as to reduce the likelihood of accessing the micro cell base station. The radio network determines whether the mobile accesses the macro cell base station or the micro cell base station depending upon the mobile's received pilot power of each base station (step S6). The macro cell base station is selected if the macro cell base station's pilot power (as modified if mobile velocity is to be taken into account) is greater than that of the micro cell base station. Of course, other factors may be taken into account in the base station selection process.

Figure 7:
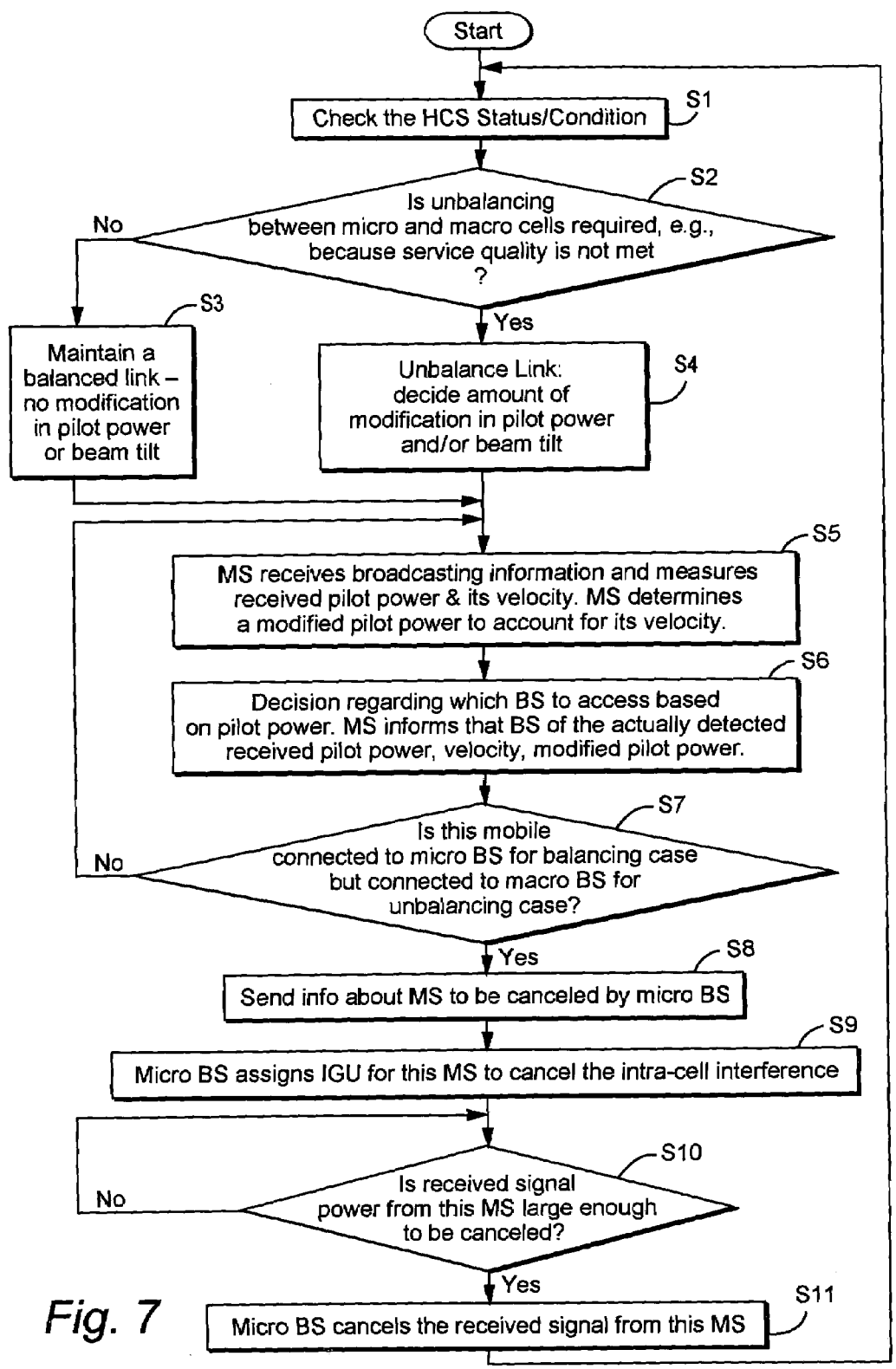
FIG. 7 is a flow chart diagram illustrating procedures in accordance with another non-limiting example for implementing and managing an unbalanced link a HCS like that shown in FIG. 4 in a cellular communications system.

FIG. 7 illustrates another embodiments with non-limiting, example procedures related to certain additional aspects of the present invention. In step S1, the radio network controller 12 checks on the status/condition of the HCS system to determine what type of link is needed or is appropriate. In the decision step S2, based on the status/condition, the decision is made whether an unbalanced or balanced link between the micro and macro cell boundaries is required. As explained above, this link unbalancing decision is made by the radio network controller based on any appropriate factor(s). One such example factor which suggests that unbalancing the link may be necessary because there is a likelihood of service "outage," i.e., a certain percentage of mobiles in the HCS will likely not receive a minimum desired service quality. If the service quality or other criterion/criteria is/are met, a balanced link is maintained (step S3). No modification in pilot power or beam tilt is made.

In the case of an unbalanced link, the radio network controller decides an amount by which to unbalance the link and sends (in this example) a command to the micro base station to effect that unbalance (step S4). As described above, this example embodiment is suitable when interference cancellation is applied to the micro cell base station and the third example way of effecting the unbalance is used. Specifically, the third way subtracts an offset value informed on broadcasting channel from the received pilot power.

Each mobile station in the micro cell or in the macro cell close to the micro cell receives broadcasting information from the macro cell base station or the micro cell base station and measures the received pilot power of those respective signals (step S5). The mobile station also preferably (but not necessarily) measures its own current velocity, which may be used to determine a modified pilot power with an offset value provided by a broadcasting channel. For a higher mobile velocity, the offset value increases the modified pilot power so as to reduce the likelihood of accessing the micro cell base station. The radio network determines whether the mobile accesses the macro cell base station or the micro cell base station depending upon the mobile's received pilot power of each base station (step S6). The macro cell base station is selected if the macro cell base station's pilot power (as modified if mobile velocity is to be taken into account) is greater than that of the micro cell base station. Of course, other factors may be taken into account in the base station selection process.

Steps S7–S11 in the flow chart in FIG. 7 relate to interference cancellation. Although interference cancellation may be desirable, it is not always needed when operating with an unbalanced link. The decision depends on the degree of unbalance and on the traffic load difference between the uplink and the downlink. If the uplink load is considerably high or the unbalance is substantial, or both, then uplink interference cancellation becomes more desirable. If a subtractive type of interference cancellation is used, (other interference cancellation techniques may be used), then timing information and scrambling/spreading code information pertinent to the mobile are needed. Depending upon the type of interference cancellation used, it may also be important to know whether the uplink transmission to be cancelled originates from (1) a mobile station outside the micro cell (inter-cell), or (2) a mobile station inside the micro cell (intra-cell).

A decision is made in step S7 whether this mobile happens to be connected to the micro base station in a balanced link situation but is connected to the micro base station in the unbalanced link situation. If this is the case, the radio network controller sends information about this mobile station including its scrambling/spreading code, velocity, detected power levels, timing, etc. to the micro base station for potential use in interference cancellation (step S8). In step S9, the micro cell base station assigns an interference generation unit (IGU) for this mobile station for purposes of generating a replica of intra-cell uplink interference caused by this mobile station. A decision is made in step S10 whether the uplink signal power from this mobile station is sufficiently large to warrant cancellation. If so, the micro base station cancels the received signal from this mobile station using interference cancellation techniques (step S11).

The invention has been described in connection with what is presently considered to be the most practical and preferred embodiments. For example, there have been various approaches and parameters described with respect to determining whether to unbalance a link, how to unbalance the link, and whether/how to perform interference cancellation. Any combination of these variations may be employed. In addition, other approaches and/or parameters may be used. But it is to be understood that the invention is not to be limited to the disclosed embodiments or examples. On the contrary, the invention is intended to cover various modifications and equivalent arrangements included within the scope of the appended claims.

The invention claimed is:

1. A method for use in a cellular communications system that includes a macro cell encompassing a smaller micro cell, comprising:
   determining and establishing an uplink communication cell boundary between the macro cell and the micro cell, and
   determining and establishing a downlink communication cell boundary between the macro cell and the micro cell different from the uplink communication cell boundary,
   wherein the uplink communication cell boundary is larger than the downlink communication cell boundary, the method further comprising:
   determining whether an uplink interference level at the micro cell base station exceeds a threshold, and if so, performing an interference cancellation operation to compensate for the uplink interference level, wherein the determining step includes:
   determining whether to compensate for intra-cell uplink interference in the micro cell, and
   detecting one or more parameters regarding one or more mobiles on the macro cell side of the downlink communication cell boundary, and
   wherein the performing step includes using those one or more parameters for uplink interference cancellation in the micro cell.

2. The method in claim 1, wherein the downlink communication cell boundary is established by reducing a power at which a broadcast signal is transmitted from a base station associated with the micro cell.

3. The method in claim 1, wherein the downlink communication cell boundary is established by tilting a downlink antenna beam of a base station associated with the micro cell that transmits a broadcast signal from the micro cell to reduce the coverage of the broadcast signal.

4. The method in claim 1, wherein the downlink communication cell boundary is established by. decreasing a detected power level of a signal transmitted by the micro cell.

5. The method of claim 1, wherein the communications system is a CDMA system.

6. The method in claim 1, further comprising:
   determining that a mobile station is moving a velocity greater than a predetermined velocity, and
   effectively decreasing the downlink communication micro cell boundary.

7. A method for use in a cellular communications system that includes a macro cell encompassing a smaller micro cell, the macro cell including a macro cell base station and the micro cell including a micro cell base station, comprising:
   determining whether a condition in the system indicates that a downlink micro cell boundary between the macro cell and the micro cell, wherein the downlink cell boundary is associated with an effective range of a transmission from the micro cell base station, and an uplink micro cell boundary between the macro cell and the micro cell should be unbalanced wherein the uplink cell boundary is associated with a range of transmission from a mobile station to the micro cell base station,
   if the condition is met, reducing the downlink micro cell boundary to effect an unbalance between the uplink and downlink microcell boundaries,
   employing an offset to reduce a detected power level of a pilot transmitted by the micro cell base station, and
   transmitting a command to one or more mobile stations in the system to reduce a detected power level of a pilot transmitted by the micro cell base station by an offset amount included in the command.

8. The method in claim 7, wherein the condition is based on a probability that a mobile station in the system will not receive a predetermined service quality when the uplink and downlink micro cell boundaries are balanced.

9. The method in claim 7, wherein the condition is based on one or more of the following: system load, traffic, radio link propagation condition between the macro cell base station and the mobile station, height of an antenna in the macro cell base station, cell size, geographical relationship between the macro cell base station and the micro cell base station, and mobile station speed.

10. The method in claim 7, wherein the downlink cell boundary is reduced by reducing a power at which a pilot signal is transmitted from a base station associated with the micro cell.

11. The method in claim 7, wherein the downlink cell boundary is reduced by tilting a downlink antenna beam of the micro cell base station that transmits a micro cell pilot signal.

12. The method in claim 7, wherein the downlink cell boundary is reduced by decreasing a detected power level of a pilot transmitted by the micro cell base station.

13. The method in claim 7, wherein the communications system is a CDMA system, the method further comprising:
   determining if interference associated with an uplink transmission from a mobile station to the macro cell base station is likely to exceed a predetermined limit, and
   if so, performing interference cancellation the micro cell base station.

14. Apparatus for use in a cellular communications system that includes a macro cell encompassing a smaller micro cell, comprising:
   means for determining and establishing an uplink communication cell boundary between the macro cell and the micro cell, and
   means for determining and establishing a downlink communication cell boundary
   between the macro cell and the micro cell different from the uplink communication cell boundary,
   wherein the uplink communication cell boundary is larger than the downlink communication cell boundary, the apparatus further comprising:
   means for determining whether an uplink interference level at the micro cell base station exceeds a threshold, and if so, performing an interference cancellation operation at a receiver at the micro cell to compensate for the uplink interference level,
   wherein the mean for determining is configured to determine whether to compensate for intra-cell uplink interference in the micro cell; and to detect one or more parameters regarding one or more mobiles on the macro cell side of the downlink communication cell boundary; and
   wherein the means for performing is configured to provide the one or more parameters for use in uplink interference cancellation in the micro cell.

15. The apparatus in claim 14, further comprising: means for reducing a power at which a broadcast signal is transmitted from a base station associated with the micro cell to reduce the downlink communication cell boundary.

16. The apparatus in claim 15, further comprising:
   means for tilting a downlink antenna beam of a base station associated with the micro cell that transmits a pilot signal from the micro cell to reduce the coverage of the pilot signal.

17. The apparatus in claim 15, further comprising:
   means for decreasing a detected power level of a signal transmitted by the micro cell.

18. The apparatus in claim 15, wherein the communications system is a CDMA system.

19. The apparatus in claim 15, further comprising:
   means for determining that a mobile station is moving a velocity greater than a predetermined velocity, and
   means for effectively decreasing the downlink communication cell boundary.

20. A node for use in a cellular communications system that includes a macro cell encompassing a smaller micro cell, the macro cell including a macro cell base station and the micro cell including a micro cell base station, comprising:

a supervisory controller configured to control one or more operations of the macro cell base station and the micro cell base station, and
a link balance controller, coupled to the supervisory controller, configured to determine whether a condition indicates that an unbalanced link should be implemented between a downlink micro cell boundary between the macro cell, wherein the downlink cell boundary is associated with an effective range of a transmission from the micro cell base station, and the micro cell and an uplink micro cell boundary between the macro cell and the micro cell, wherein the uplink cell boundary is associated with a range of transmission from a mobile station to the micro cell base station, and if so, to reduce the downlink micro cell boundary to implement the unbalanced link
wherein the link balance controller is further configured to employ an offset to reduce a detected power level of a pilot transmitted by the micro cell base station and to transmit a command to one or more mobile stations in the system to reduce a detected power level of a pilot transmitted by the micro cell base station by an offset amount included in the command.

21. The node in claim 20, wherein the node is a radio network controller.

22. The node in claim 20, wherein the condition is based on a probability that a mobile station in the system will not receive a predetermined service quality when the uplink and downlink micro cell boundaries are balanced.

23. The node in claim 20, wherein the condition is based on one or more of the following: system load, traffic, radio link propagation condition between the macro cell base station and the mobile station, height of an antenna in the macro cell base station, cell size, geographical relationship between the macro cell base station and the micro cell base station, and a mobile station's speed.

24. The node in claim 20, wherein link balance controller is configured to transmit a command to the micro cell base station to reduce a power at which a pilot signal is transmitted from the micro cell base station.

25. The node in claim 20, wherein link balance controller is configured to transmit a command to the micro cell base station to tilt a downlink antenna beam of the micro cell base station that transmits a pilot signal from the micro cell.

26. The node in claim 20, wherein link balance controller is configured to determine if interference associated with an uplink transmission from a mobile station to the macro cell base station is likely to exceed a predetermined limit, and if so, to transmit a command to the micro cell base station to perform interference cancellation.

27. A hierarchical cell structure (HCS) system, comprising:
   a macro cell encompassing a smaller micro cell, the macro cell including a macro cell base station and the micro cell including a micro cell base station, and
   a radio network controller, coupled to the macro cell base station and the micro cell base station, configured to determine whether an unbalanced link should be implemented between a downlink micro cell boundary between the macro cell and the micro cell, wherein the downlink cell boundary is associated with an effective range of a transmission from the micro cell base station, and an uplink micro cell boundary between the macro cell and the micro cell, wherein the uplink cell boundary is associated with a range of transmission from a mobile station to the micro cell base station, and if so, to reduce the downlink micro cell boundary to implement the unbalanced link,
   wherein radio network controller is further configured to employ an offset to reduce a detected power level of a pilot transmitted by the micro cell base station and to send a command with the offset to one or more mobile stations in the system to reduce mobile-detected pilot power levels by the offset included in the command.

28. The HCS system in claim 27, wherein radio network controller is configured to transmit a command to the micro cell base station to reduce a power at which a pilot signal is transmitted from the micro cell base station.

29. The HCS system in claim 27, wherein radio network controller is configured to transmit a command to the micro cell base station to tilt a downlink antenna beam of the micro cell base station that transmits a pilot signal from the micro cell.

* * * * *